United States Patent [19]
Maxey

[11] 3,914,592
[45] Oct. 21, 1975

[54] UNDERWATER LIGHT CIRCUIT
[75] Inventor: Eugene R. Maxey, Valinda, Calif.
[73] Assignee: Purex Corporation, Lakewood, Calif.
[22] Filed: Sept. 3, 1974
[21] Appl. No.: 502,903

[52] U.S. Cl............................. 240/26; 200/61.04
[51] Int. Cl.²............................................ F21V 31/00
[58] Field of Search......... 240/26; 200/61.04, 61.05

[56] References Cited
UNITED STATES PATENTS
3,440,396  4/1969  Greene ..................... 200/61.04 X
3,732,556  5/1973  Caprillo et al. ............. 200/61.04 X

*Primary Examiner*—Robert P. Greiner
*Attorney, Agent, or Firm*—White and Haefliger

[57]  ABSTRACT

Underwater electric light circuitry includes electrodes exposed for contact with water to cause shut-off of power to the electric lamp when the light is pulled from the water.

7 Claims, 3 Drawing Figures

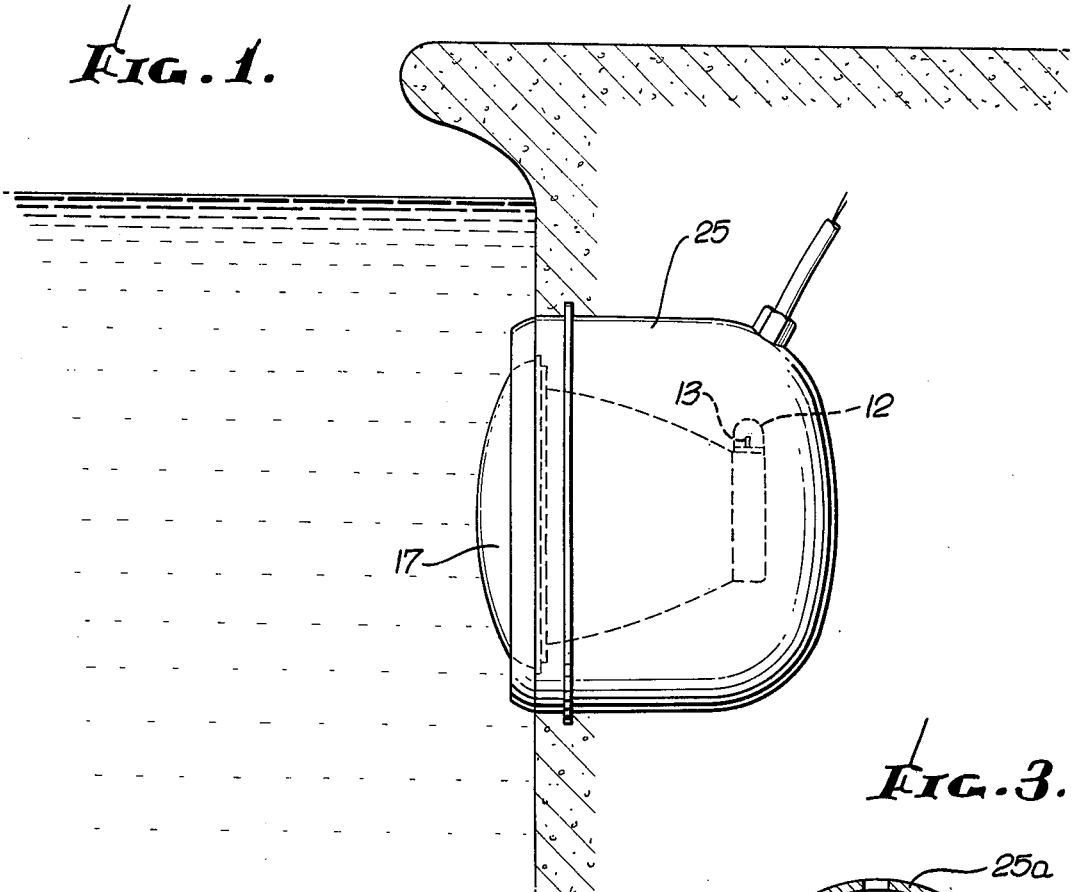
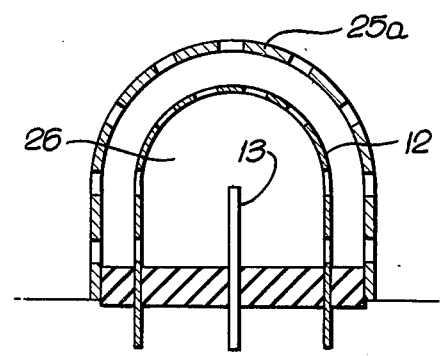
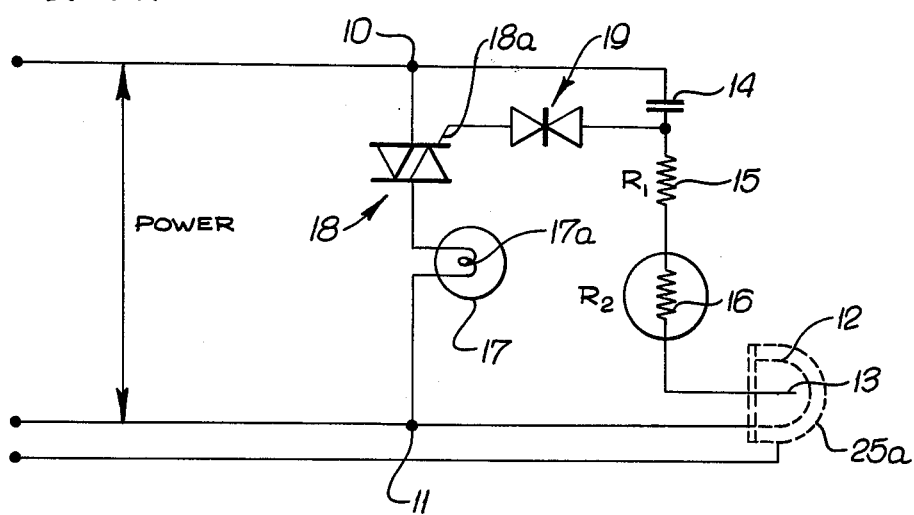

UNDERWATER LIGHT CIRCUIT

BACKGROUND OF THE INVENTION

This invention relates generally to underwater lights, and more particularly concerns improvements in swimming pool light safety features.

The existing designs of swimming pool lights lack inherent safety, in that they operate satisfactorily only when fully submerged. If such lights are pulled from the water with the power left on, several risks of serious danger exist. These include shock hazard; damage to wiring insulation due to generation of excessive heat which is not conducted to surrounding water; and the possibility of lens explosion due to excessive heat build-up. There is also the problem of damage to the light due to heat build-up when the pool water level is below the top of the light.

SUMMARY OF THE INVENTION

It is a major object of the invention to provide swimming pool light apparatus and circuitry obviating the above problems, as well as providing additional unusual advangtages as will appear. Basically, the underwater light circuit comprises:

a. a pair of terminals across which AC power is applicable, b. a pair of electrodes exposed for contact with the water, one electrode electrically connected with one of said terminals, c. a network including resistance and capacitance connected in series between the other of said electrodes and the other of said terminals, d. an electric lamp having a filament and a gate controlled switch connected in series with the filament between said terminals, and e. means electrically connected between said network and the gate of said switch to effect turn-on of said switch in response to predetermined charging of said capacitance occuring when current passes between said electrodes.

Accordingly, when the light is pulled from the water, and/or the water level drops below the level of the light, the circuit is opened thereby shutting off the light. Also, bulb life is extended, as will appear.

Additional objectives include the provision of cimple triac and diac control elements in the circuitry; the protection of the exposed electrodes as afforded by a shell extending about the lamp, and the protective reception of one electrode within the other, as will be seen.

These and other objects and advantages of the invention, as well as the details of an illustrative embodiment, will be more fully understood from the following description and drawings, in which:

DRAWING DESCRIPTION

FIG. 1 is a drawing of an underwater light unit incorporating the invention;

FIG. 2 is a circuit diagram; and

FIG. 3 shows an electrode assembly.

DETAILED DESCRIPTION

Referring first to FIG. 2, the light circuit includes a pair of terminals, as for example at 10 and 11, across which electrical power is applied (such as 115 VAC). A pair of metal electrodes, as at 12 and 13, is exposed for contact with the water, and such electrodes also appear in FIG. 3. One electrode, as for example 12, is electrically connected with one of the terminals indicated at 11, and which may be a common terminal. A network including resistance and capacitance is connected in series between the other electrode 13 and the other terminal 10. Examples of such network elements are the capacitor 14, resistor 15 and temperature responsive resistance 16.

A filament 17a of electric lamp 17 and a gate controlled switch 18 are also connected in series between the terminals 10 and 11; further, means is electrical connected between the network as described and the gate 18a of the switch to effect turn-on of the switch in response to predetermined charging of the capacitance occurring when current passes between the electrodes 12 and 13. Semiconductor switch 18 is preferably a bilateral semiconductor device known as a triac. It is triggered into conduction in either direction when a voltage pulse of either polarity is applied to its gate electrode. The referred to means preferably includes a bidirectionally conductive device such as the diac 19, which is voltage sensitive diode and which breaks down and conducts current in either one or two directions when the voltage across it rises to a predetermined level, when the applied voltage difference falls below a predetermined holding level, the diac reassumes its blocking condition.

In operation, when the light is pulled from the water and the water level drops below the top of the light, the circuit is opened, thereby shutting off all power to the lamp. When the light is fully submerged, the circuit is closed via water conductivity between the two electrodes. The current flows from one electrode to another, through the two resistors, allowing the capacitor to charge to the firing point of the diac, thereby energizing the triac which conducts limited current to the lamp. The current flow heats 16 and lowers its resistance, allowing more current to flow to the diac and triac which allows the lamp to become brighter. Extended life of the bulb filament 17a is achieved, inasmuch as when power is applied to the circuit, the initial energization of the filament is relatively low, and it builds up gradually to full intensity eliminating the initial full power surge which reduces the life of the light bulb in conventional equipment.

FIG. 1 shows the provision of a protective shell 25 enclosing the hermetically sealed lamp 17, with the electrodes 12 and 13 exposed to the water receiving space between the shell and lamp. Electrode 12 may preferably be protectively dome shaped and perforate to admit water to the interelectrode space 26 as seen in FIG. 3. Note "hot" electrode 13 projecting in that space. Grounded perforate shell 25a in FIG. 3 corresponds to shell 25 in FIG. 1.

I claim:

1. In an underwater light circuit, a. a pair of terminals across which AC power is applicable, b. a pair of electrodes exposed for contact with the water, one electrode electrically connected with one of said terminals, c. a network including resistance and capacitance connected in series between the other of said electrodes and the other of said terminals, d. an electric lamp having a filament and a gate controlled switch connected in series with the filament between said terminals, and e. means electrically connected between said network and the gate of said switch to effect turn-on of said switch in response to predetermined charging of said capacitance occurring when current passes between said electrodes.

2. The circuit of claim 1 wherein said means includes a diac.

3. The circuit of claim 1 wherein said gate controlled switch comprises a triac.

4. The circuit of claim 1 including a protective shell extending about said lamp, said electrodes exposed in a space formed between the housing and lamp.

5. The circuit of claim 1 wherein one of the electrodes is dome shaped and perforate, and the other electrode projects into a recess formed by said one electrode.

6. The circuit of claim 1 wherein said resistance includes a temperature responsive resistance element.

7. The circuit of claim 1 wherein said network is electrically connected with that side of the capacitor to which said resistance is also connected.

* * * * *